ERROR ELIMINATING CODE TRANSMISSION SYSTEM
Filed June 28, 1961 5 Sheets-Sheet 1
Fig. 1. Part 1
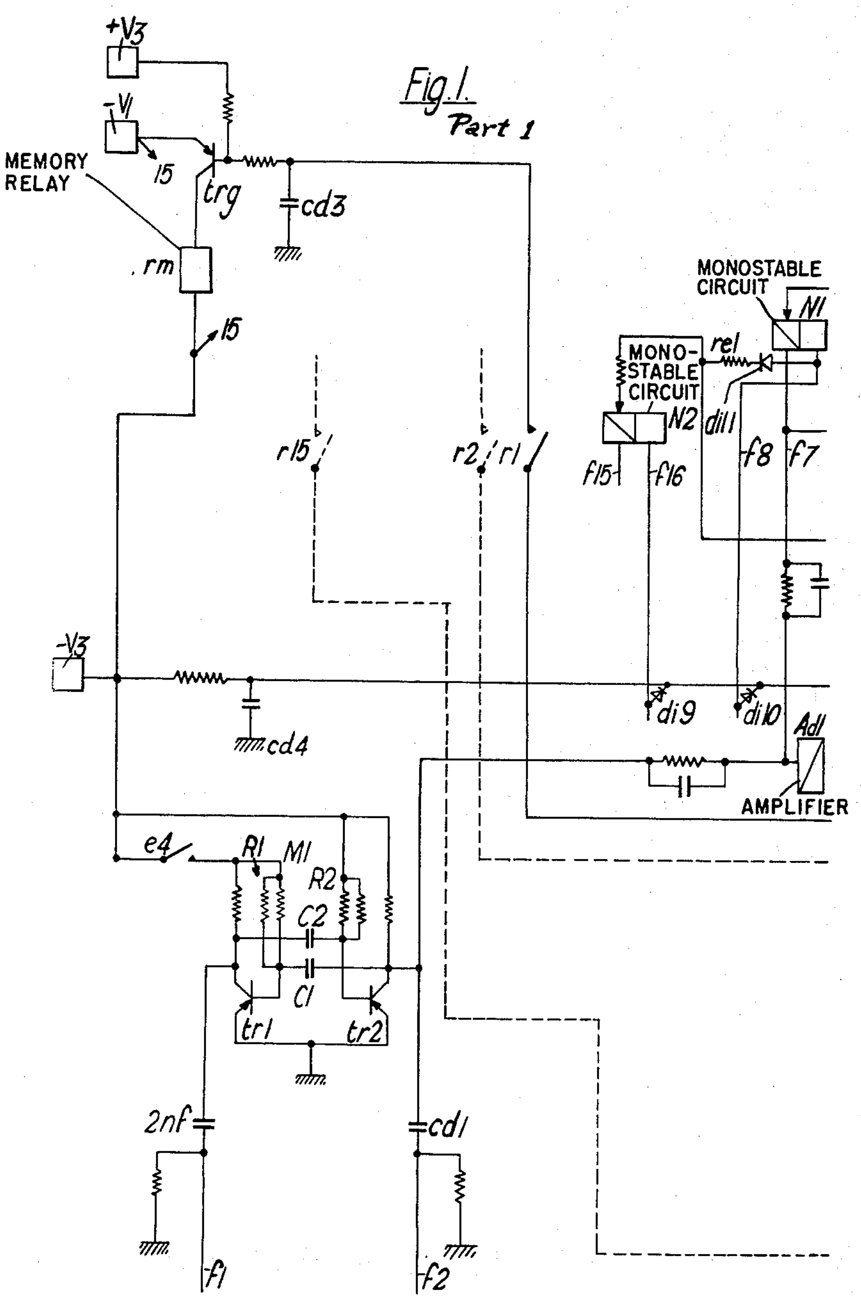
Inventor
HENRI BENMUSSA
By Paul W. Hemminger
Attorney Fig. 1 Part 2
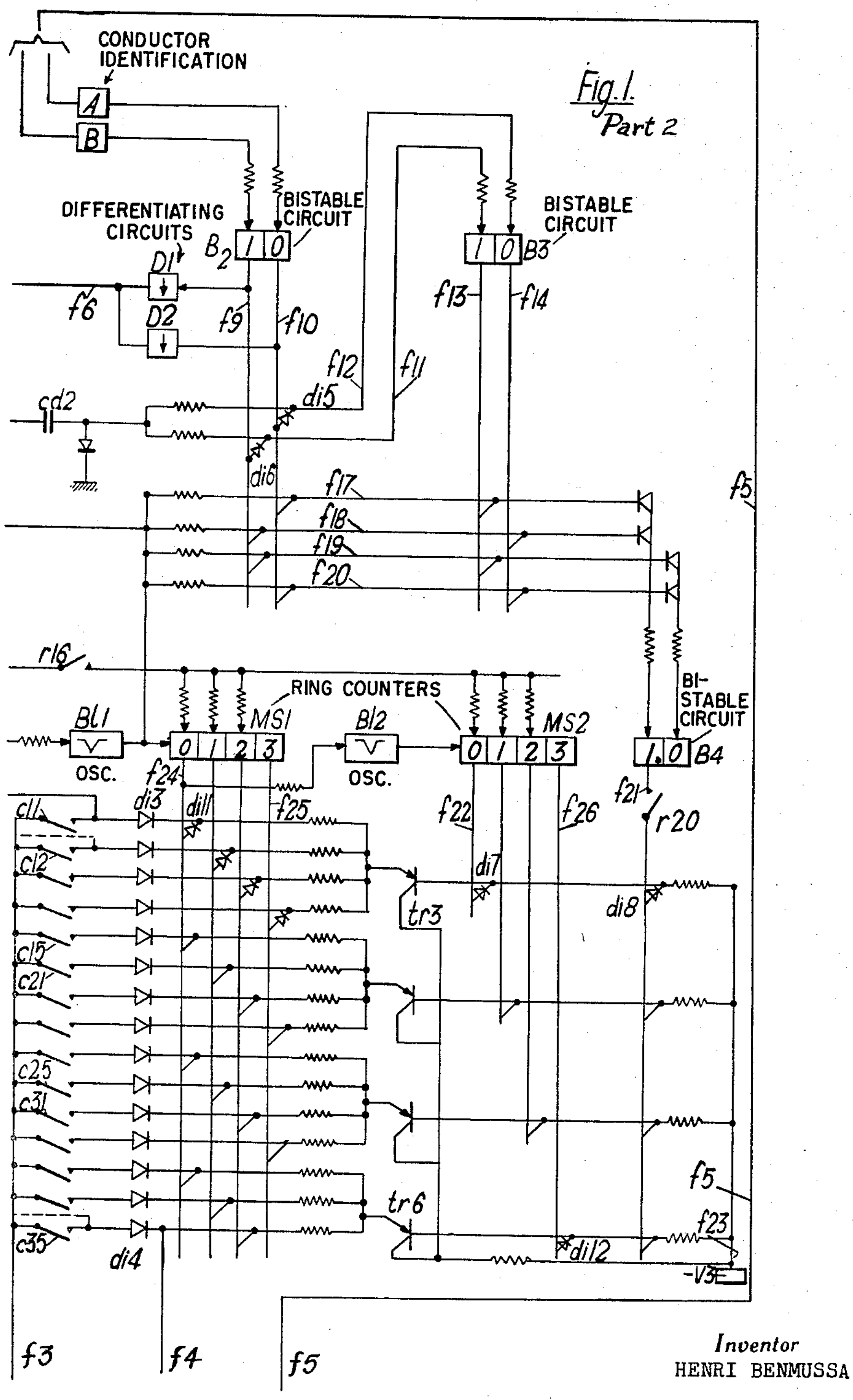
Inventor
HENRI BENMUSSA
By Paul W. Hemminger
Attorney

*Inventor*
HENRI BENMUSSA

By Paul W. Hemminger
*Attorney*

Inventor
HENRI BENMUSSA
By Paul W. Hemminger
Attorney

May 10, 1966 H. BENMUSSA 3,250,998

ERROR ELIMINATING CODE TRANSMISSION SYSTEM

Filed June 28, 1961 5 Sheets-Sheet 5

Inventor
HENRI BENMUSSA

By Paul W. Hemminger
Attorney

United States Patent Office 3,250,998
Patented May 10, 1966

3,250,998
ERROR ELIMINATING CODE TRANSMISSION SYSTEM

Henri Benmussa, Meudon, France, assignor to International Standard Electric Corporation, New York, N.Y., a corporation of Delaware Filed June 28, 1961, Ser. No. 120,361
Claims priority, application France, July 1, 1960 831,767, Patent 1,270,087
7 Claims. (Cl. 325—41)

This invention relates in general to code transmission systems and in particular to code transmission systems utilized in automatic telephone systems. Its principal object is to provide a simple, yet reliable system, of the above character for the transmission of data between transmitting and receiving terminals of telephone exchanges, which system has a high degree of line noise immunity to thus reduce the likelihood of registering erroneous code elements.

An example of a well-known code signalling system is disclosed in French Patent No. 1,181,437. In this patent, two distinct elements "1" and "0" are used for the composition of signals to be transmitted. The start of each element is marked by a change in the electrical characteristic of the transmission line, which start indication is used to synchronize the scanner at the receiver with the scanner at the transmitter. Also, the electrical condition of the line is changed in the middle of the transmission of a code element if the element being transmitted is a "1." However, if the transmitted element is a "0," the line condition is not changed. The signalling current can be either direct current utilizing two different polarities or alternating current utilizing two frequencies or combinations of different frequencies. With the advent of electronic components, such signalling can be carried out quite rapidly with the transmission time of each code element being less than one millisecond.

However code signalling systems presently available are adversely effected by parasitic noises. These noises can cause the registration of erroneous code elements and the loss of synchronization between transmitting and receiving portions of the system.

Accordingly, it is an object of the present invention to provide code signalling systems with registers at the receiving end that operate only when the same code element is received during successive cycles.

Another object of the invention is to provide special code elements in every cycle to synchronize the receiving line with the transmitting end.

Yet another object of the present invention is to provide code signalling systems that use 2 out of 5 binary codes.

According to the present invention, the transmission accuracy of the system of the noted patent is increased by transmitting data in the form of a succession of code elements in a cyclic manner with each cycle containing the same number of "1's" and the same number of "0's" with the nature of the data being determined by the respective positions of the "1's" and the "0's" in the cycle.

In order to avoid the registering of errors caused by disturbing line noises, an integrating device is provided at the receiving end of the transmission line which prevents the registering of any code element unless such element has been received during two or more successive cycles.

The synchronization between the scanners at the receiving and transmitting ends of the signal line is accomplished by detecting the electrical condition of the line at the beginning and at the middle of each transmitted code element.

In addition, at the termination of the data transmission a special synchronizing signal is transmitted.

In greater detail, the invention comprises a transmitting system and a receiving system. The data to be transmitted is stored in an outgoing register in a binary code comprising 1's and 0's. A multivibrator time base continuously transmits timed spaced pulses, automatically, on a first and a second conductor. A scanner controlled by the timer sequentially reads out the registered data. The time base multivibrator is connected to a binary counter through the aforementioned two conductors. The scanner information is used to control a gate on the second conductor. When a binary "1" is read out the polarity at the output of the binary counter is changed. When a digit "0" is read the plurality at the output of the binary counter is unchanged.

The output of the binary counter is connected through a trunk to the receiver in the receiving system. This receiver monitors the state of the line at all times. A second monitor is used to determine the condition of the line at the beginning of each bit of information. The output of both monitors is fed into a comparator which determines whether a binary "0" or a binary "1" has been received. If a binary "1" has been received the state of the line in the middle of the bit will have changed from its beginning state. A scanner synchronized with the transmitting scanner passes the received bit information into an integrating circuit. When two successive identical signals are received by the integrating circuit the received bits are then stored in the incoming register.

Other objects and features of the invention will become apparent and the invention will be best understood when the specification is read in conjunction with the accompanying sheets of drawings comprising FIGS. 1 to 5 wherein:

FIGS. 1 and 2 show a schematic diagram of a combined receiver and transmitter at one end of the transmission line;

A detailed description will now be given of the transmitter portion of the terminal at one end of the transmission line.

Assuming that there are 3 digits to be transmitted, the first digit is registered beforehand in the transmitter and its nature is characterized by the work position of two contacts chosen among the 5 contacts c11 . . . c15. This storage utilizes a two-out-of-five coding which provides ten combinations which give the receiving end the possibility of error checking, as an error can be detected by the reception of a number of elements less than or greater than two. The second digit is registered in the same manner by contacts c21 . . . c25 and the third digit is registered by the contacts c31 . . . c35.

When the apparatus at the transmission end is operated, the voltages V3, V2, V1 are effective since the contacts e1, e2, e3, e4, are closed. As an example, there can be chosen for V3, V2, V1, the following values, taken in comparison with ground as the reference potential:

$$V3=20 \text{ volts}$$
$$V2=12 \text{ volts}$$
$$V1=3 \text{ volts}$$

Figure 3:
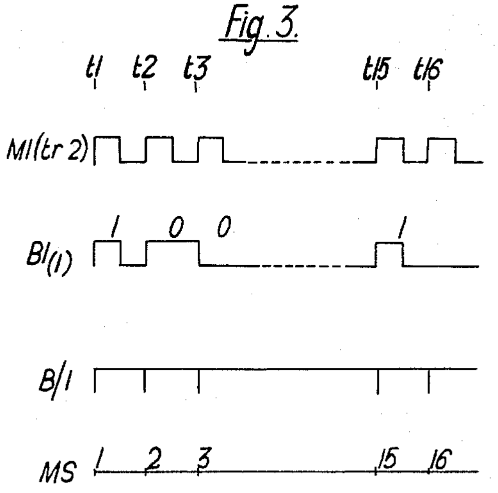
FIG. 3 shows pulse waveforms for the transmitting apparatus.
Figure 5:
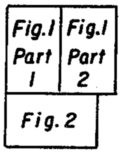
FIG. 5 shows the way in which FIGS. 1 and 2 of the drawings should be arranged for a complete understanding of the invention.
Figure 6:
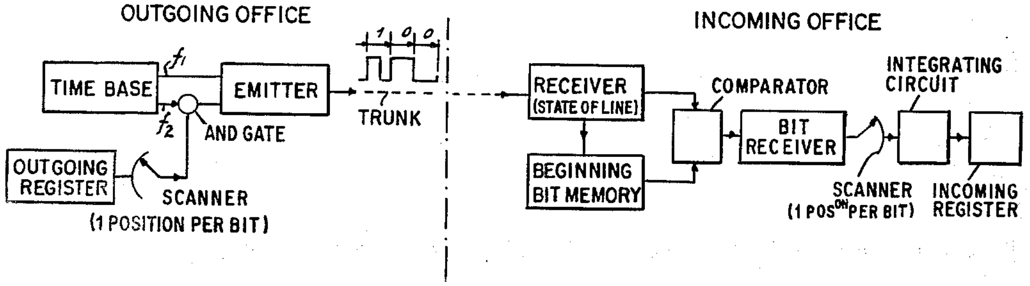
FIG. 6 is a block diagram of the transmitting and receiving systems.

The multivibrator M1 starts, and provides the collectors of the transistors tr1 and tr2 with rectangular oscillations. There is shown, in FIG. 3, the curve of voltages appearing on the collector of the transistor *tr*2. This multivibrator is utilized as a timing generator. A full oscillation appearing on the collector of the transistor *tr*2 corresponds to a code element, the middle of the code element coinciding with the change in polarity of the oscillation. In FIG. 3, the beginning of the successive code elements are marked by the instants *t*1, *t*2, *t*3, . . . *t*15, *t*16.

The first positive impulse sent out by the transistor *tr*2 is switched, through the amplifier A*d*1 to the oscillator BL1. The oscillator BL1 originates a sharp impulse of a few microseconds, as is shown in the diagram of FIG. 3, and thus advances the ring counter MS1 to its position 0. As a result of ring counter MS1 assuming such position, the oscillator BL2 supplies a sharp impulse which advances the ring counter MS2 to its position 0.

Each one of the two counters MS1 and MS2 has four positions resulting in 16 code combinations. A scanner of 16 positions is therefore obtained with the first 15 positions respectively utilized for the transmission of the 15 code elements that correspond to the 3 digits to be transmitted. The 16th code combination is utilized to synchronize the scanners of the transmitting and receiving ends, as will be described hereafter. The positions "0" of the two counters MS1 and MS2 correspond to the transmission of the first code element, while the positions 3 of both counters correspond to the synchronizing moment.

The function of the scanner, comprising the two ring counters MS1 and MS2, consists in switching the negative potential —V3 of wire *f*23 to one of the fifteen contacts *c*11 . . . *c*15, *c*21 . . . *c*25, *c*31 . . . *c*35. More specifically, the scanner, in the case considered here, is in its first position (MS1 and MS2 in 0). That is, all outputs of the ring counters except the first position are grounded so that only wires *f*24 and *f*22 both connected to the negative potential —V3. In such condition, the potential —V3 of wire *f*23 is applied to the base of the transistor *tr*3. On the other hand, this same negative potential cannot be applied to the base of the transistor *tr*6 since diode *di*12 is biased in the forward direction due to the connection of wire *f*26 to ground, and the base of transistor *tr*6 is itself connected to ground. It is seen therefore that the counter MS2 switches the negative potential —V3 of wire *f*23 to the transistor corresponding to its position.

In the same way, it is understood that a negative potential —V3, appearing on the emitters of the transistors *tr*3 . . . *tr*6 can be switched by counter MS1 to one of the fifteen contacts *c*11 . . . *c*15, *c*21 . . . *c*25, *c*31 . . . *c*35. In order to simplify the diagram, certain diodes have been represented by an oblique stroke terminated by a full-stop, the forward direction of the diode being always directed towards that full stop.

The first positive impulse appearing on the collector of transistor *tr*2 is differentiated by condenser *cd*1 and the differentiated pulse is applied over wire *f*2 to the binary counter B1. This counter can be made up, for instance, of a transistor bistable circuit. The noted impulse is received through the two diodes *di*1 and *di*2 which control automatically the switch-over of the position of the bistable circuit. In order to facilitate the explanations that follow, it is assumed that the bistable circuit passes to its position 1 at the very instant under consideration, a positive impulse thus appearing at the output position "1."

It has been assumed, in the present example, that the contact *c*11, corresponding to the first code element of the first digit, was previously closed. The transistor *tr*3 is set according to so-called "constant potential collector" mounting. In such condition, the negative potential —V3 applied from wire *f*23 is passed through the transistor *tr*3, diode *di*3 and contact *c*11 to the base of the transistor *tr*7 which is of the NPN type. This transistor is therefore blocked and remains blocked without any effect upon the next positive impulse generated by the multivibrator M1 and transmitted over wire *f*1. This multivibrator impulse will thus cause counter B1 to change to its position 0. Thus there appears, at the end of the first moment and at the output of position "1" of the counter B1, a voltage, the form of which is indicated in FIG. 3. As can be seen, the beginning of this first code element is characterized by a change of polarity; the middle of the amount is also characterized by a change of polarity, but, only because the contact *c*11 corresponding to the first code element was closed.

The voltage appearing at position 1 of the counter B1 is switched through amplifier A*d*4, contact *e*3 and contact *e*1, to the lower portion of the primary winding of transformer T1. The middle point of the secondary winding of transformer T1 is connected to ground. The two halves of the transformer T1 winding are wound in opposite directions, so that a positive impulse at position "1" of counter B1 generates two equal positive voltages which appear on the two line wires. On the other hand, a positive impulse at position "0" of counter B1 generates two equal negative voltages which appear on the two line wires. The line is therefore balanced at all instances, which enhances the avoidance of the disturbing effects of crosstalk.

At the beginning of the second code element, that is to say at instant *t*2 (FIG. 3), the multivibrator M1 generates another positive impulse which appears on the collector of transistor *tr*2. The scanner steps forward to position "2" as described (MS1 in position 1, MS2 in position 0). This impulse is also passed to counter B1 and the operations already described ensue with the exception of the following points. It was assumed, in the previous example, that the contact *c*12 corresponding to the second code element was open. Due to this, the base of the transistor *tr*7 is connected to the positive potential V2, which renders it conductive. The positive impulse sent over wire *f*1 during the second half of the code element is thus diverted through the transistor *tr*7 and can no longer act upon the counter B1, the latter remaining in the same position during the entire duration time of the code element.

From the foregoing explanations it is apparent that the code element "1," which corresponds to a closed contact, results in the generation of a voltage, which changes polarity in the middle of the code element; while the code element 0, which corresponds to an open contact, results in the generation of a constant voltage during the entire duration time of the code element.

The code elements corresponding to contacts *c*13, *c*14, *c*15, *c*21 . . . *c*25, *c*31 . . . *c*35 are generated and suppressed or passed according to the same process. It will be noted that only after the generation of the 4th moment that the ring-counter MS1, restores to position 0 and causes the stepping forward of the counter MS2 to position "1." Counter MS2 thus advances one step each time that MS1 restores to its rest position.

When the multivibrator M1 sends a positive impulse on wire *f*2 which corresponds to the beginning of the 16th code element, the scanner reaches the last position (position 3 for each of the counters MS1 and MS2), but this stepping forward takes place with a short shifting of time as compared to the leading edge of the positive impulse due to delays brought about by the different elements which are inserted in the stepping circuit of the scanner. During this short shift of time, the negative potential —V3 is passed to the base of the PNP type transistor *tr*8 through transistor *tr*6. In this way, the transistor *tr*8 is conductive and the positive impulse which appears on wire *f*2 is passed through transistor *tr*8 so that it can no longer act upon the counter B1. The signal generated at the beginning of the sixteenth code element is therefore characteristized by a non-change of polarity as compared to the preceding signal.

In the middle of the sixteenth code element, there can be no change of polarity due to the fact that transistor *tr7* is conducting. The sixteenth code element is thus similar to the code element "0" with the only difference being that there is no change of polarity at the beginning of the code element. This code element is utilized to synchronize the scanner at the receiving end.

After the generation of the sixteenth code element, the scanner restores to position "1," and the described cycle of operations starts over again and repeats several times. When all the code elements have been registered by the receiving end, the transmitting side receives an appropriate signal by well-known means. The contacts *e*1, *e*2, *e*3, *e*4, open, and the multivibrator M1 stops. The different voltages V3 and V2, which are necessary for the operation of the system are removed and the equipment is restored to normal.

Figure 2:
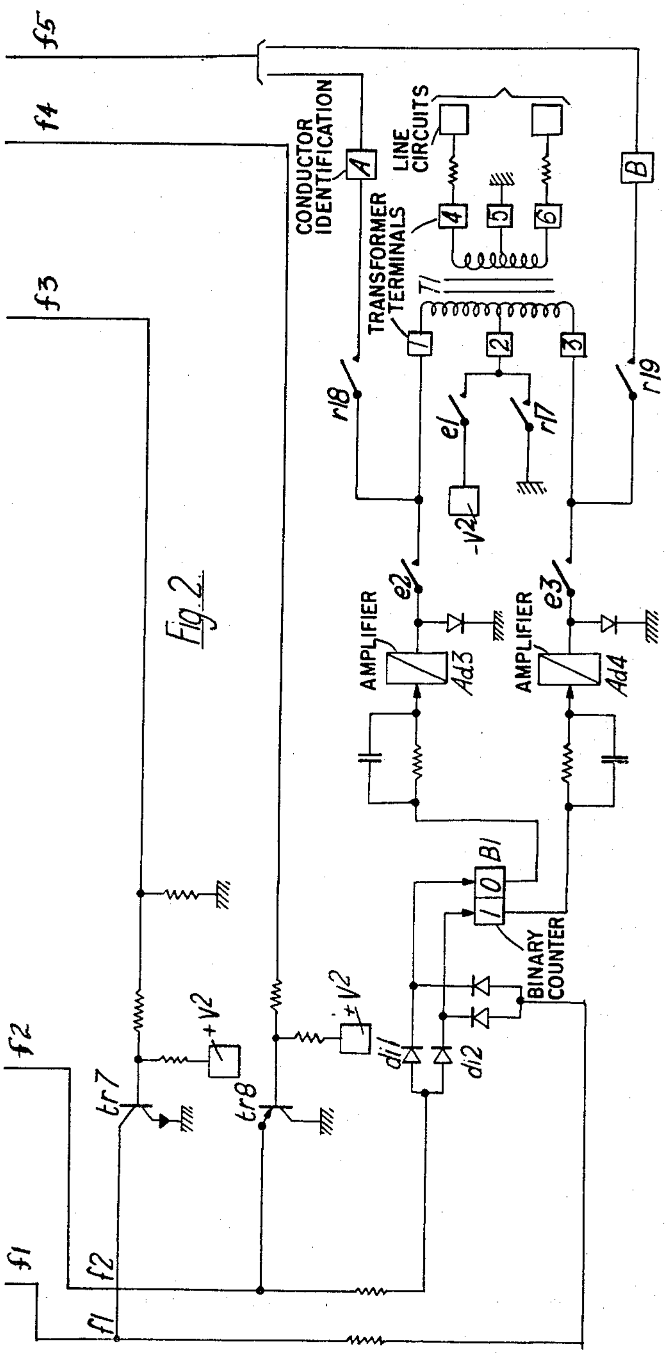

The receiving operation of the apparatus will now be explained with reference to FIGS. 1, 2 and 4. When the apparatus is in the receiving condition, the contacts *r*1, . . . *r*15, *r*16, *r*18, *r*19, *r*20 are closed. The different code elements are received by means of two equal voltages on the line wires for balancing purposes. When these voltages are negative, the lower end of the left winding of transformer T1 has a negative potential thereon, which is transmitted to the bistable binary counter B2 through contact *r*19, wire B and cable *f*5. On the other hand, when the voltages received over the two line wires are positive, the upper end of the left winding of the transformer T1 has a negative potential thereon, which is transmitted to the binary counter B2 through contact *r*18, wire A end cable *f*5. Finally, each change of polarity on the line wires results in a change in position of the bistable circuit B2. Thus, at the input of position "1" of this bistable circuit, a voltage appears as mentioned in FIG. 4. In the example described here, it was assumed that the 3 first code elements were, respectively, "1," "0," and "0"; the fifteenth element was a "1" and the sixteenth element is a synchronization element. It is to be noted that the impulses may be received on the line even though it is more or less distorted, but the voltages appearing at the two output ends of the bistable circuit B2, are square wave pulses. The bistable circuit B2 is therefore, at every instant, in a position which characterizes the condition of the line and acts, otherwise, as a signal regenerator.

The bistable circuit B2, at each output position regenerates a voltage of the same polarity as the one received at the input. The output of bistable circuit B2 includes differentiating circuits D1, D2 which respond to the negative impulses. Thus, sharp impulses appear on wire *f*6 on every change in polarity of the received signals on the line, as shown in FIG. 4 by the curve D (*f*6).

The sharp negative impulse received over wire *f*6 corresponds to the beginning of the first code element and causes the monostable circuit N1 to trigger into its work position. In such position, wire *f*7 assumes a negative potential, and wire *f*8 becomes grounded. When the sharp impulse received upon wire *f*6 ceases, the monostable circuit N1 remains in its work position for about three quarters of the first moment, as is shown in FIG. 4 by curve N1 (*f*7).

The negative impulse appearing on wire *f*7 is differentiated by condenser *cd*2 and passed to the bistable binary counter B3. The sharp impulse thus obtained is passed to input terminal 1 of the bistable circuit B3 over wire *f*11, at the same time wire *f*9 is brought to a negative potential. This impulse cannot be transmitted on wire *f*12, since wire *f*10 is connected to ground and the diode *di*5 is therefore conducting. The diodes *di*5 and *di*6 operate therefore like "and" gates, a negative impulse only being delivered at the output when the two inputs are simultaneously negative. The bistable circuit B3 is triggered therefore in its position 1, wire *f*13 being then at a negative potential. The bistable circuit B3 characterizes the condition of the line at the beginning of each received code element.

As it was assumed that the first code element received was a "1," wire *f*9, which characterizes the condition of the line, changes its condition in the middle of the element. It is grounded as shown in FIG. 4, when wire *f*10 becomes negative.

Figure 4:
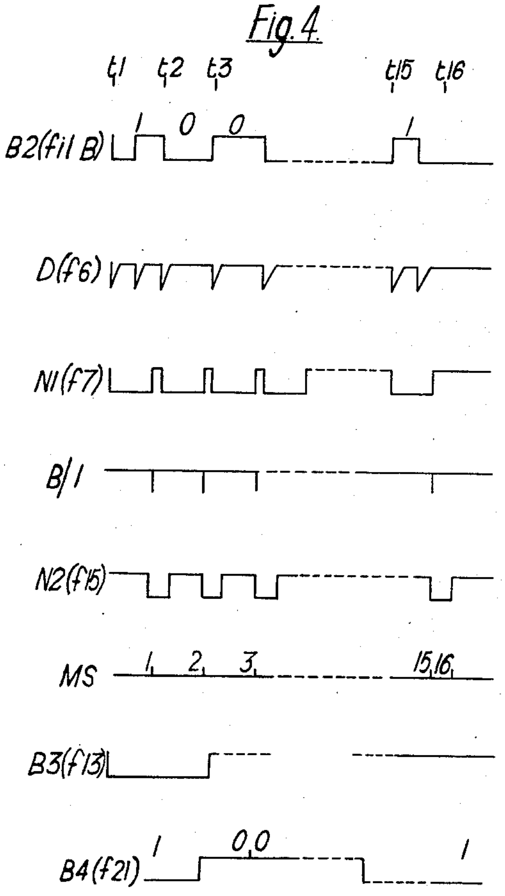
FIG. 4 shows pulse waveforms for the receiving apparatus.

At an instant, which is approximately three quarters the duration of the first code element, the monostable circuit N1 restores to rest condition, wire *f*7 being grounded as shown in FIG. 4. The generated positive impulse is transmitted through amplifier A*d*1 to the locked oscillator BL1 which operates and sends out a sharp negative impulse for a period of about 10 microseconds. This impulse starts the operation of the monostable circuit N2 which goes over to its work position that is with wire *f*15 at a negative potential, as shown in FIG. 4, and wire *f*16 grounded. At the same time, the impulse is passed to the monostable circuit N1 through the resistance *re*1 and the diode *di*11 in order to speed up the restoring of the said monostable circuit to its rest condition. The impulse generated by the oscillator causes the switch-over of the counter circuit MS1 to its "0" position. Thus, the oscillator BL2 sends out a sharp impulse and causes the counter MS2 to change over to its position "0." The scanner made up of the combining of the two counters MS1 and MS2 lies therefore in a position which corresponds to the reception of the first code element.

The output of the oscillator BL1 is connected to the bistable circuit B4 through "and" gates similar to those made up of the diodes *di*5 and *di*6.

With an aim of simplifying the description, these diodes, have been represented schematically by a mere oblique stroke terminated by a full stop, and indicating that, the passing direction is towards this full stop. In case there has been a change in the condition of the line at the middle of the moment (reception of the code element "1"), the two bistable circuits B2 and B3 are in discordant positions; the "and" gates of the two wires *f*17 or *f*18 are conductive and the impulse generated by the oscillator BL1 is passed to input terminal 1 of the bistable circuit B4. In case there has been no change of the condition of the line in the middle of the code element (reception of a "0"), the two bistable circuits B2 and B3 are in similar positions; the "and" gates of the two wires *f*19 or *f*20 are conductive; and the impulse generated by the locked oscillator BL1 is passed to input terminal "0" of the bistable binary counter circuit B4. It follows, from the foregoing explanations, that finally the bistable circuit B4 occupies a position which characterizes the nature of the code element received. In the present example, where it was assumed that the first code element received was a "1," the bistable circuit B4 occupies position 1, which position corresponds to the connection of a negative potential —V3 to wire *f*21.

With the counter MS2 in position 0, wire *f*22 is connected to the potential —V3, so that the "and" gates made up of the diodes *di*7 and *di*8 enable the passing of the negative potential —V3 from wire *f*23 to the base of the transistor *tr*3. As has been mentioned, such transistor is set with the fixed potential collector, so that the negative potential —V3 appears on the emitter thereof. With the counter MS1 in position 0, wire *f*24 is connected to the negative potential —V3, so that the negative potential —V3 appearing on the emitter of transistor *tr*3 causes the partial charging of the condenser *cd*3 through the diode *di*3 and the contact *r*1. Normally, the transistor *tr*9 has its base positively polarized by the potential +V3, and the charge power of the condenser *cd*3 when receiving the negative potential —V3 during one cycle is insufficient to cause its unblocking. This arrangement prevents the unblocking of the transistor and the prematured energizing of the memory relay *rm* under the effect of a disturbing noise on the line. However, transistor $tr9$ will unblock and relay $rm$ will operate at the second cycle if the first code element of this cycle is identical to the first code element of the first cycle. Thus is realized a security device which is quite simple and inexpensive.

The monostable circuit N2 remains in its work position (wire $f15$ at negative potential and wire $f16$ connected to ground) during a period of time a little greater than the half of a moment (FIG. 4).

The second code element is received in the same manner as described when the scanner assumes position 2 (counter MS1 in position 1 and counter MS2 in position 0). But, as this code element is an "0," the bistable circuit B4 is in position 0 (wire $f21$ connected to ground). The "and" gates comprising the diode $di8$ is closed and the negative potential —V3 of wire $f23$ is no longer applied to the base of the transistor $tr3$. The condenser $cd3$ associated with the memory of the second code element thus cannot charge.

The following code elements are received in a similar manner. It will be noted, as indicated for the operation of the transmitting apparatus that the counter MS2 advances a step forward each time the counter MS1 restores to its position 0, which is the time the reception is made of the 5th, 9th, and 13th code elements.

The 16th code element utilized for the synchronization of the scanners at the transmitting end and at the receiving end is characterized by the fact that the condition of the line does not change at the beginning nor at the middle of the code element time period (FIG. 4). At the beginning of this element, the bistable circuit B2 does not change its position and no impulse is sent over wire $f6$.

Thus, the monostable circuit N1 remains in its rest position (wire $f7$ connected to ground, and wire $f8$ connected to a negative potential). The monostable circuit N2, which was in its work condition during the preceding code element, restores to its rest condition shortly after the first quarter of the 16th element (wire $f16$ connected to a negative potential). Thus, the "and" gates made up of the diodes $di9$ and $di10$ are both conductive, enabling the negative potential —V3 to be applied to the stages 0, 1, 2 of the counters MS1 and MS2. Therefore, these two counters advance to position 3, if they were not already in such position, which corresponds to the 16th and last position of the scanner. In the case of accidental dephasing the two scanners are therefore automatically replaced into synchronization at the reception of the 16th and last code element of a cycle. The condenser $cd4$ functions to prevent the untimely sending out of the negative potential —V3 on the counters MS1 and MS2 during the short instant when the monostable circuit N1 has restored to rest condition and the monostable circuit N2 has not yet switched over to its work position.

The different operations corresponding to the second cycle take place according to a similar process, with the only exception that when a code element "1" is received, the condenser $cd3$ associated to the corresponding memory charges up fully and causes the unlocking of the transistor $tr9$. Further memory relay $rm$ is energized and holds energized.

When all the elements of this code have been received on the memory relays such as relay $rm$, a switching device (not shown) operates and causes the sending of a signal towards the transmitting end. The two monostable circuits N1 and N2 both restore to rest condition, which causes the restoring to rest condition of the scanner. Then, contacts $r1$ . . . $r20$ are opened and the current feeding voltages are removed.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In an error eliminating code transmission system for transmitting and receiving signals corresponding to binary code elements over a trunk connecting transmitting and receiving portions of the system, a transmitter memory for storing data to be transmitted and a receiver memory for storing received data, scanner means for scanning said transmitter memory to transmit binary code elements in succession in accordance with the stored data to be transmitted and for scanning said received memory to control the recording of each received succession of binary code elements, cycling means for providing signals to control the said scanning means to cyclically scan the said transmitter memory, gate means operated responsive to signals obtained from said transmitter memory through said scanning means and from said cycling means to cyclically transmit the said succession of binary code elements, binary counter emitter means operated responsive to the receipt of said elements from said gate means and a signal received from said cycling means for transmitting the said succession of binary code elements through said trunk to said receiving portion of said system, and means in the said receiver memory responsive to the receipt of identical binary code elements in a plurality of successive cycles for storing data corresponding to said received binary code elements.

2. A signalling system as set forth in claim 1, wherein the said means in the said receiver memory for recording data responsive to the receipt of identical binary code elements in a plurality of successive cycles includes integrating means for integrating the respective code elements of each of said cycles.

3. A signalling system as set forth in claim 2, wherein said scanner means includes a differentiating circuit for differentiating said signals from said cycling means, and a binary counter which changes position for each differentiated pulse and wherein gating means is provided for disabling the said means for altering the electrical condition of said line during the midpoint of the transmission interval when said counter corresponds to a "0" position during the midpoint of any transmission interval.

4. A signalling system as set forth in claim 1, wherein said receiver scanning means includes a first bistable circuit for detecting the electrical condition of said line at every instant and a second bistable circuit for detecting the electrical condition of said line at the beginning of each transmitted binary code element and wherein comparison means compares the position of said first and second bistable circuit to determine the "1" and "0" condition of the transmitted code elements.

5. A signalling system as set forth in claim 1, wherein means are provided for storing the said data in the said transmitter memory in a two-out-of-five code.

6. In a signalling system as set forth in claim 1, wherein the said binary code comprises a "1" condition and an "0" condition and wherein each of said cycles of transmission of binary code elements comprises the same number of "1's" and the same number of "0's" with the nature of the data being determined by the respective positions of the "1's" and the "0's" in the cycle, said emitter means operated responsive to the start of the transmission of each binary code element corresponding to data for changing the electrical polarity of said signals on said trunk, and means including said gate means operated responsive to the transmission of a "1" binary code element for altering the electrical condition of said line during the midpoint of the transmission interval of said element.

7. A signalling system as set forth in claim 6 and scanner synchronization means in said receiving memory means operated responsive to a predetermined code combination, scanner synchronization means associated with said scanner means for scanning said received memory, said synchronization means operated responsive to a predetermined code combination for synchronizing transmit and receive operations of said scanner means, and means for transmitting the said predetermined code combination without alteration of the electrical condition of said line.

References Cited by the Examiner

UNITED STATES PATENTS

| | | | |
|---|---|---|---|
| 2,892,888 | 6/1959 | James et al. | 340—146.1 |
| 2,897,275 | 7/1959 | Bowers | 325—38.1 |
| 2,897,480 | 7/1959 | Kamagai | 340—146.1 |
| 2,944,110 | 7/1960 | Royden et al. | 340—146.1 |
| 2,946,044 | 7/1960 | Bolgiano et al. | 179—15 |
| 2,957,947 | 10/1960 | Bowers | 325—38.1 |
| 2,983,789 | 5/1961 | Henning | 340—146.1 |
| 3,091,664 | 5/1963 | Tyrlick | 179—15 |

FOREIGN PATENTS

| | | |
|---|---|---|
| 684,318 | 12/1952 | Great Britain. |

DAVID G. REDINBAUGH, *Primary Examiner.*

R. H. ROSE, *Examiner.*

J. W. SAUNDERS, T. G. KEOUGH, R. L. GRIFFIN, *Assistant Examiners.*